United States Patent Office 2,929,810
Patented Mar. 22, 1960

2,929,810
GREEN DYES FOR POLYESTER FIBERS

Roderick H. Horning, Reading, Pa., assignor to Crompton & Knowles Corporation, Worcester, Mass., a corporation of Massachusetts No Drawing. Application June 23, 1958
Serial No. 744,005

7 Claims. (Cl. 260—206)

This invention relates to a new class of anthraquinone compounds especially useful as dyes for reasons mentioned more fully hereinafter.

The new compounds are formed by condensing certain anthraquinone derivatives with various azoanilines which are mildly basic and which do not have large or bulky substituent groups positioned ortho to the amine which are of a type that will interfere with the condensation reaction. Where the azoaniline, per se, is capable of imparting yellow shades to hydrophobic fibers the compounds resulting from the condensation reaction will be green shaded dyes. Further, where the dyes are intended for use on polyester terephthalate fibers, it is necessary to employ azoanilines which are free of substituent groups such as —$SO_3H$ and —COOH which would have a water solubilizing effect on the dyestuff.

The compounds of this invention have the following structure:

$$R_1—NH—R_2—N=N—R_3 \quad \text{(Structure I)}$$

In Structure I, $R_1$ represents a dinitrodihydroxyanthraquinone radical in which at least one nitro group is in para position to a hydroxyl group; $R_2$ represents one of the following divalent radicals:

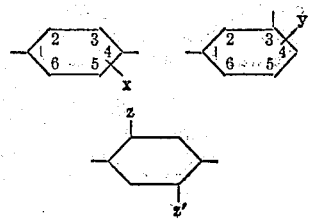

and

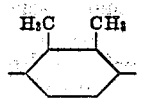

$x$ represents a monovalent substituent selected from the group consisting of —H, -alkyl and -O-alkyl substituted in any available position and from —Cl in position 3; $y$ represents a monovalent substituent selected from the group consisting of —H and —$CH_3$ in any available position and —$OCH_3$ in positions 2 and 4; and $z$ and $z'$ represent monovalent substituents selected from the group consisting of —$CH_3$, —$OCH_3$; and $R_3$ represents a monovalent radical selected from the group consisting of:

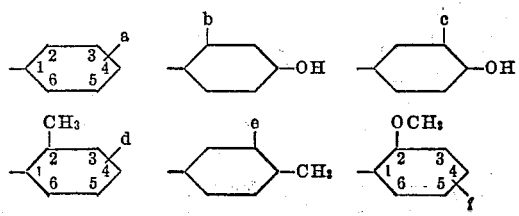

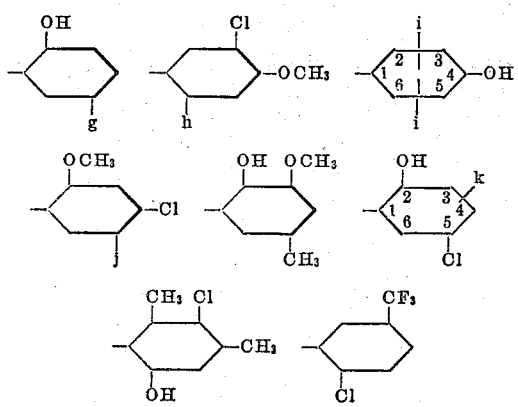

and

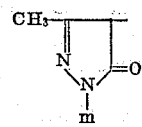

wherein $a$ represents a substituent selected from the group —H, -alkyl, -O-alkyl, —$NO_2$, —Cl and -alkyl-OH at any available position and from —OH, —CN, -N-di(alkyl-OH), and —NH-alkyl-OH at position 4; $b$ represents a substituent selected from the group consisting of —OH and —$CH_3$; $c$ represents a substituent selected from the group consisting of —$CH_3$, —Cl and -phenyl; $d$ represents a substituent selected from the group consisting of —$CH_3$, —$OCH_3$, and —Cl at any available position and -alkyl-OH at position 3; $e$ represents a substituent selected from the group consisting of —$CH_3$, —$OCH_3$ and —Cl; $f$ represents a substituent at either of positions 4 or 5 selected from the group consisting of —$CH_3$, —$OCH_3$ and —Cl; $g$ represents a substituent selected from the group consisting of —$CH_3$, —Cl and -phenyl; $h$ represents a substituent selected from the group consisting of —H, —OH and —$OCH_3$; $i$ and $i'$ represent identical substituents at either the 2,6-positions or 3,5-positions selected from the group consisting of —$CH_3$ and —$OCH_3$; $j$ represents a substituent selected from the group consisting of —$CH_3$ and —$OCH_3$; $k$ represents a substituent selected from the group consisting of —$CH_3$ at position 3, —OH at position 4 and —$OCH_3$ at position 4; $m$ represents a substituent selected from the group consisting of —H and -phenyl.

The intermediates to be used in the preparation of the Structure I compounds of this invention which have the aforementioned $R_2$ and $R_3$ substituent groups are in some instances commercially available materials or they can be prepared from commercially available materials by conventional techniques.

From the standpoint of cost of raw materials utilized, the simplicity of intermediate preparation and the fullness of the green color when used on polyester fibers, compounds having the following structure are especially desirable:

$$R_1—NH—R_4—N=N—R_5 \quad \text{(Structure Ic)}$$

In Structure Ic, $R_1$ represents the same anthraquinone radicals as in Structure I; $R_4$ represents a divalent radical having the following structure:

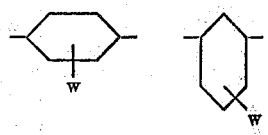

and

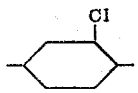

in which $w$ is a substtiuent selected from the group consisting of —H, —CH$_3$ and —OCH$_3$; and R$_5$ is a radical selected from the group consisting of

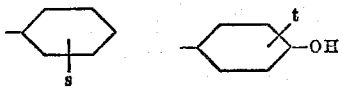

and

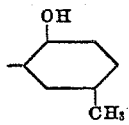

wherein $s$ is a substituent selected from the group —H, —CH$_3$, —OCH$_3$, —Cl and —NO$_2$ and $t$ is a substituent selected from the group —H and —CH$_3$.

The anthraquinone derivatives which are especially useful in the preparation of the new compounds of this invention are 4,8-dinitroanthrarufin (Intermediate I$a$) and 4,5-dinitrochrysazin (Intermediate I$b$). Both intermediates are available commercially.

Structure I compounds when prepared from 4,8-dinitroanthrarufin will have the following general structure:

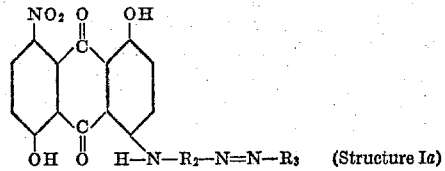

and when prepared from 4,5-dinitrochrysazin will have the following general structure:

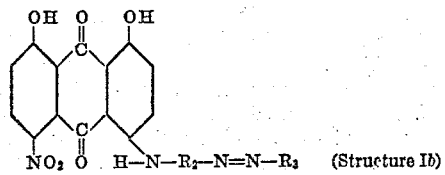

To prepare the Structure I compounds of this invention the anthraquinone derivatives are condensed with certain azoaniline compounds which have the following structure:

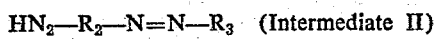

the R$_2$ and R$_3$ radicals representing the same substituent groups described by R$_2$ and R$_3$ in Structure I.

The reactions by which the type I and type II Intermediates are condensed to form Structure I compounds merely involves a replacement of one of the nitro groups of the anthraquinone with the amino group of the azoaniline compound and similar condensations are well known in the art.

The various type II Intermediates can be prepared in several ways all of which are well known. For example, they can be prepared by coupling appropriate nitrodiazonium salts with appropriate phenolic compounds to give the desired positioning of substituent groups in the R$_2$ and R$_3$ radicals and reducing the nitro group to an amine. They can also be prepared by coupling aryl amines with other aryl amines.

The Structure I compounds of this invention are especially useful as dyestuffs for polyester fibers such as those prepared from terephthalic acid and ethylene glycol ("Dacron" and "Terylene"). The Structure I dyes of this invention are insoluble in water and impart a green color to polyethylene terephthalate fibers which is outstanding with respect to fastness to light, to washing and to sublimation. When used as dyestuffs it is necessary to apply them from a dispersion as is conventional in this art.

Heretofore, homogeneous green dyes for polyethylene terephthalate fibers were unknown, and when it was desired to impart a green color to such fibers, it was necessary to employ heterogeneous dyes or to subject the fibers to separate dyeing operations with blue and yellow dyes.

The Structure I compounds are useful for dyeing other types of hydrophobic synthetic fibers such as nylon (polyamide type), and "acrilan" (modified acrylic fibers). The dyes of this invention do not dye cellulose or regenerated cellulose but when applied to such cellulosics blended with synthetics, especially polyester fibers, very striking color effects are obtained.

Other objects and advantages of the invention will appear in the ensuing discussion and the illustrative examples showing the preparation of some Structure I type compounds and how the dyes so produced may be used. In these examples unless otherwise indicated, parts are by weight, temperature are given in degrees centigrade and percentages are percentages by weight.

*Example 1*

A mixture containing 138 parts p-nitroaniline, 300 parts 30% hydrochloric acid and 500 parts water was warmed to 65° and slowly poured into a mixture containing 260 parts of 4 N sodium nitrite solution and 700 parts of ice. Saturated sulfamic acid solution was added until excess nitrous acid was eliminated. The resultant product was filtered and slowly added to a mixture of 104 parts of 92% phenol, 2000 parts water, 20 parts glacial acetic acid, 15 parts sodium acetate and sufficient ice to cool to 10°. Sodium acetate was added to the coupling mixture simultaneously such that 330 parts sodium acetate were added at the time all the above diazonium chloride solution was added. The coupling mixture was treated with 120 parts sodium hydroxide and heated to 46°. To this warm mixture 950 parts of 20% sodium sulfide solution was added over a period of 4 hours. Sufficient 30% hydrochloric acid was added to precipitate the yellow 4-(p-aminophenylazo)phenol and the resultant mixture was filtered and washed with water. The moist filter cake was repasted in 2,000 parts water, filtered and dried.

A mixture prepared from 16.5 parts 4,8-dinitroanthrarufin, 24 parts 4-(p-aminophenylazo)phenol, 2.6 parts nitrobenzene and 56 parts 2-butoxyethanol was heated, with stirring, at 150–155° for 18 hours. The resulting hot, green product was poured into 700 parts of 1% sodium hydroxide solution. This mixture was treated with sufficient 30% hydrochloric acid to precipitate a green product. The precipitated product was permitted to settle and the supernatant liquor was removed by decantation. The residue was thoroughly mixed with 800 parts of water, permitted to settle and separated from the supernatant liquor by decantation. The crude product thus obtained was purified by treatment with a 1% sodium hydroxide solution and thereafter the dye was precipitated by careful neutralization with 30% hydrochloric acid, heating the mixture to 90–95° and filtering. This purification procedure was repeated a second time and the solid product obtained was dried. It has the formula

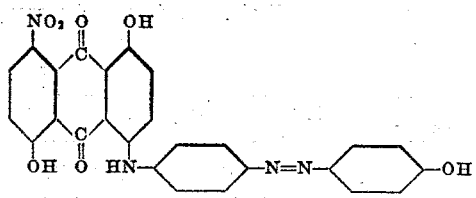

(Compound I)

and is a green-black powder which dyes polyethylene terephthalate fibers (such as "Dacron") in clear, green shades of outstanding fastness to light, to washing, and to sublimation.

*Example II*

A mixture consisting of 16.5 parts 4,8-dinitroanthrarufin, 12 parts p-phenylazoaniline and 67 parts 2-butoxyethanol was heated at the reflux temperature, with stirring, for eight hours. The mixture was then cooled to room temperature, filtered, and washed with a little 95% ethanol. The solid product was extracted with several 50 ml. portions of warm acetone. The acetone extract was poured into 500 parts of 5% sodium hydroxide solution and heated to the boil. The solid product was separated by filtration. The crude dye obtained in this manner was purified by boiling with 5% sodium hydroxide solution, and thereafter filtered, washed with water and dried. It has the formula:

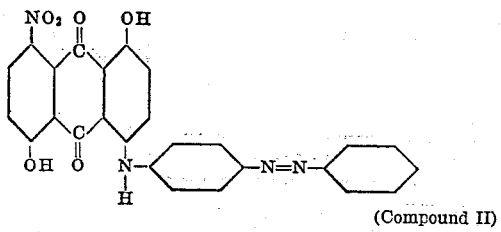

(Compound II)

and is dark colored powder which dyes polyethylene terephthalate fibers (such as "Dacron") in clear green shades.

*Example III*

A mixture consisting of 16.5 parts 4,8-dinitroanthrarufin, 13.5 parts 4-o-tolylazo-o-toluidine and 67 parts 2-butoxyethanol was heated at the reflux temperature for 24 hours, with stirring, and then cooled to room temperature. The mixture was diluted with 50 parts of 95% ethanol and filtered. The solid product was twice mixed with 100 parts of 95% ethanol, heated to the boil, filtered and washed with a little 95% ethanol. The crude dye obtained in this manner was purified by boiling with 5% sodium hydroxide, filtering and washing with water. This purification process was repeated several times. The solid product obtained was finally dried. It has the formula

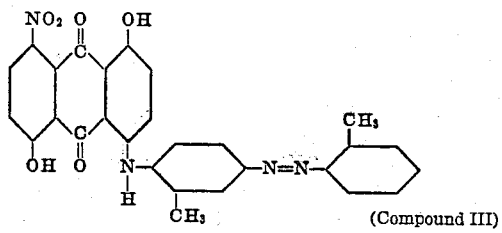

(Compound III)

and dyes polyethylene terephthalate fibers (such as "Dacron") in green shades.

The azoanilines used in Examples II and III are commercially available materials; other azoanilines having Structure II which are useful in the production of the new compounds of the invention can be prepared in the manner described in Example I for the production of the 4-(p-aminophenylazo)phenol. For example, an azoaniline of the following structure:

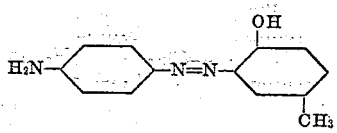

can be prepared by substituting p-cresol for the phenol used in Example I. When this compound is condensed with 4,8-dinitroanthrarufin as in Example I the resulting dye has the structure:

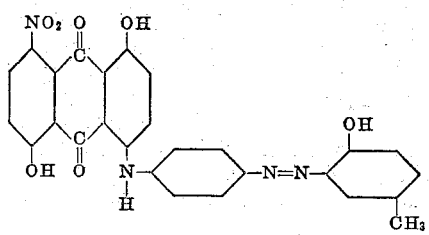

(Compound IV)

Where m-nitrobenzenediazonium chloride is substituted for p-nitrobenzenediazonium chloride and coupled with phenol and reduced as described in Example I, the resulting azoaniline has the following structure:

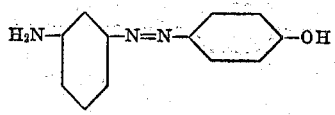

When this intermediate is condensed with 4,8-dinitroanthrarufin as in Example I, the resulting dye has the structure:

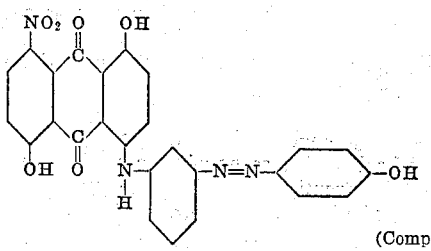

(Compound V)

When 2-chloro-4-nitrobenzenediazonium chloride is substituted for p-nitrobenzenediazonium chloride and coupled with phenol and reduced as described in Example I, the resulting azoaniline has the following structure:

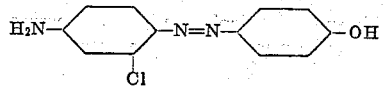

When this intermediate is condensed with 4,8-dinitroanthrarufin as in Example I, the resulting dye has the structure:

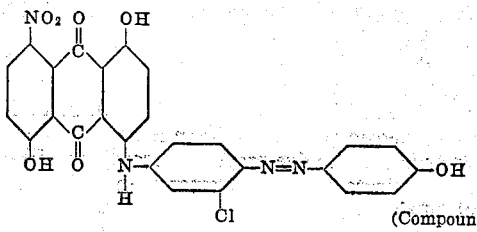

(Compound VI)

The azoanilines having Structure II can also be prepared by coupling amines to amines as described in "Fundamental Processes of Dye Chemistry" by H. E. Fierz-David and Louis Blangey, 1949, Interscience Publishers Inc., pages 270–271.

Suitable materials for use in coupling reactions to prepare type II Intermediates having the various substituent groups shown for the $R_2$ radicals in Structure I and which will form yellow shaded azoanilines include: aniline; m- and p-nitroaniline; o- and m-toluidine; 4-nitro-o- and 4-nitro-m-toluidine; 3-nitro-o- and 3-nitro-p-toluidine; 5-nitro-m- and 5-nitro-o-toluidine; o- and m-anisidine; 4-nitro-o-, 4-nitro-m-, 5-nitro-o- and 3-nitro-o-anisidine; m-chloroaniline; 2-chloro-p-nitroaniline; 2,3-xylidine; 4-nitro-2,3-xylidine; 2,5-xylidine; 4-nitro-2,5-xylidine; 2,5-dimethoxyaniline; 4-nitro-2,5-dimethoxyaniline; 6-methyl-m-anisidine; 4-nitro-6-methyl-m-anisidine; 5-methyl-o-anisidine and 4-nitro-5-methyl-o-anisidine.

Suitable reagents for use in coupling reactions for the preparation of type II Intermediates which will provide $R_3$ radicals with desired substituent groups and which will form yellow shaded azoanilines include: aniline; o-, m- and p-toluidine; o-, m- and p-anisidine; o-, m- and p-chloroaniline; o-, m- and p-nitroaniline; o-, m- and p-cresol; phenol; m-aminobenzyl alcohol; 2,3-, 2,4-, 2,5-, 2,6- and 3,4-xylidine; resorcinol; 2,4- and 2,5-dimethoxyaniline; o- and p-phenylphenol; 4-methoxy-o, 6-methoxy-m- and 5-methoxy-p-toluidine; 3-, 4-, 5- and 6-chloro-o-toluidine; 3-chloro-p-toluidine; o- and p-chlorophenol; 4-chloro-o-, 3-chloro-p- and 5-chloro-o-anisidine; 3,5- and 2,6-xylenol; creosol; 4-chloro-o-cresol; 5-methyl-4-chloro-o-anisidine; 4-chlororesorcinol; 2,6-dimethoxyphenol; 3-methoxy-4-chlorophenol; 5-chloro-2,4- and 4-chloro-2,5-dimethoxyaniline; 4-chloro-3,5 - xylenol; 6-chloro-a,a,a-trifluoro-m-toluidine; 2,2'-(phenylimino)diethanol; 2-anilinoethanol; p-aminobenzonitrile; 3-methyl- and 3-methyl-1-phenylpyrazolin-5-one; o-, p- and m-aminophenethyl alcohol and 2-methyl-m-aminophenethyl alcohol.

It will also be understood that where $-CH_3$ and $-OCH_3$ are indicated as being substituent groups in the $R_2$ and $R_3$ radicals, it is possible to substitute other monovalent lower alkyl radicals for $-CH_3$ and other monovalent lower alkoxy radicals for $-OCH_3$ without departing from the scope of my invention as such substitutions do not alter the dyeing characteristics of the dyes, and can be readily effected by the use of appropriate correspondingly substituted amines and nitroazoanilines.

Further, where the groups $-C_2H_4OH$, $-N(C_2H_4OH)_2$, and $-NHC_2H_4OH$ are indicated as a substituent group in $R_3$ radicals, it is also possible to produce dyes according to this invention in which other monovalent lower alkylol or alkyl substituents are employed.

*Example IV*

The anthraquinone Compound I (0.08 part) prepared according to Example I was thoroughly ground with 1.6 parts polyethylene glycol ("Carbowax 600") after which 1.6 parts of o-dichlorobenzene and 0.5 part "Duponol WA" (a long chain alcohol sulfate dispersing agent) was added. This solution was diluted slowly and with continued mixing to 160 parts with water. The dispersion produced in this manner was heated to 40° and 8 parts polyethylene terephthalate fiber (spun "Dacron") was then entered. The dye bath was brought to the boil in fifteen minutes and held at that temperature for an additional hour. The dyed fiber was scoured with 200 parts of a solution containing 1 part "Duponol WA" and 0.4 part sodium carbonate for fifteen minutes at 85–90°, rinsed and dried. The fiber was dyed a clear, level, bright, green shade of outstanding fastness to light, to washing, and to sublimation. In the same manner using more or less of the dye prepared according to Example I, it is possible to produce dyeings with greater or lesser depth of shade.

I claim:

1. An anthraquinone compound having the following structure:

$$R_1-NH-R_2-N=N-R_3$$

Wherein: $R_1$ is an anthraquinone radical selected from the group consisting of

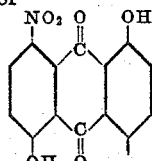

and

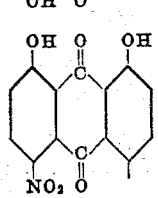

$R_2$ represents a divalent radical selected from the group consisting of:

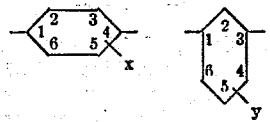

and

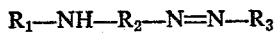

wherein $x$ represents a monovalent substituent selected from the group consisting of $-H$, -alkyl and -O-alkyl substituted at any available position and from $-Cl$ in position 3; $y$ represents a monovalent substituent selected from the group consisting of $-H$ and $-CH_3$ in any available position and $-OCH_3$ in positions 2 and 4; and $z$ and $z'$ represent monovalent substituents selected from the group consisting of $-CH_3$ and $-OCH_3$; and $R_3$ represents a monovalent radical selected from the group consisting of:

[structures a through m depicted]

wherein $a$ represents a substituent selected from the group consisting of $-H$, -alkyl, -O-alkyl, $-NO_2$, $-Cl$ and -alkyl-OH at any available position and from $-OH$, $-CN$, $-N$-di(alkyl-OH) and $-NH$-alkyl-OH at position 4; $b$ represents a substituent selected from the group consisting of $-OH$ and $-CH_3$; $c$ represents a substituent selected from the group consisting of $-CH_3$, $-Cl$ and -phenyl; $d$ represents a substituent selected from the group consisting of $-CH_3$, $-OCH_3$ and $-Cl$ at any available position and -alkyl-OH at position 3; $e$ represents a substituent selected from the group consisting of $-CH_3$, $-OCH_3$ and $-Cl$; $f$ represents a substituent at either of positions 4 or 5 selected from the group consisting of $-CH_3$, $-OCH_3$ and $-Cl$; $g$ represents a substituent selected from the group consisting of $-CH_3$, —Cl and -phenyl; h represents a substituent selected from the group consisting of —H, —OH and —OCH$_3$; i and i' represent identical substituents at either the 2,6-position or the 3,5-position selected from the group consisting of —CH$_3$ and —OCH$_3$; j represents a substituent selected from the group consisting of —CH$_3$ and —OCH$_3$; k represents a substituent selected from the group consisting of —CH$_3$ at position 3, —OH at position 4 and —OCH$_3$ at position 4; m represents a substituent selected from the group consisting of —H and -phenyl.

2. The compound

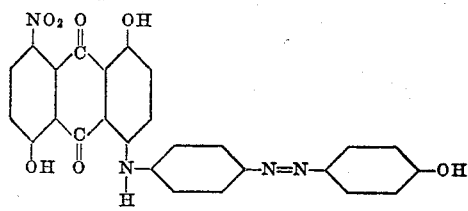

3. The compound

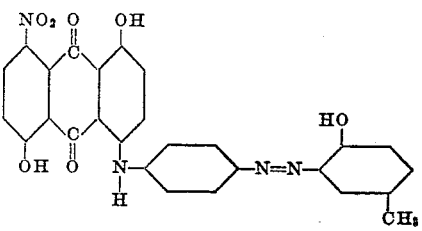

4. The compound

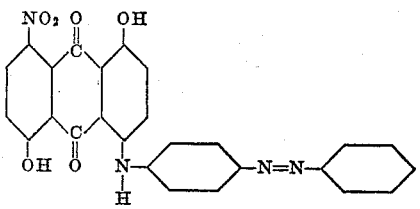

5. The compound

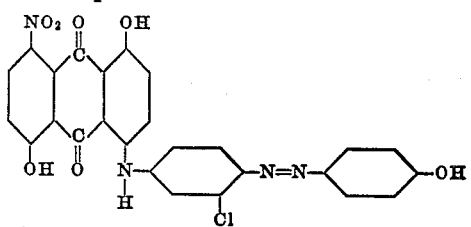

6. The compound

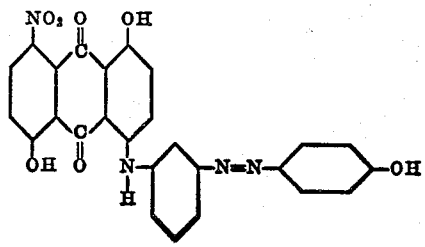

7. An anthraquinone compound having the following structure:

wherein R$_1$ is an anthraquinone radical selected from the group consisting of

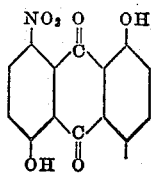

and

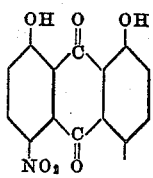

R$_4$ is a radical selected from the group consisting of

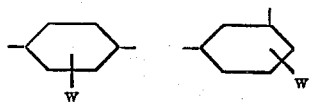

and

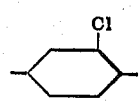

in which w represents a monovalent substituent selected from the group consisting of —H, —CH$_3$ and —OCH$_3$; and R$_5$ is a radical selected from the group consisting of

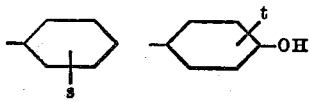

and

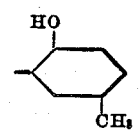

s being a substituent radical selected from the group consisting of —H, —CH$_3$, —OCH$_3$, —Cl and —NO$_2$ and t being a monovalent substituent selected from the group consisting of —H and —CH$_3$.

References Cited in the file of this patent

UNITED STATES PATENTS

| | | |
|---|---|---|
| 2,108,126 | Honold et al. | Feb. 15, 1938 |
| 2,145,954 | Semple et al. | Feb. 7, 1939 |

UNITED STATES PATENT OFFICE
CERTIFICATE OF CORRECTION

Patent No. 2,929,810            March 22, 1960

Roderick H. Horning

It is hereby certified that error appears in the printed specification of the above numbered patent requiring correction and that the said Letters Patent should read as corrected below.

Column 3, line 51, the compound should appear as shown below instead of as in the patent:

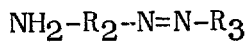

$NH_2-R_2-N=N-R_3$ column 8, lines 44 to 47, the second radical should appear as shown below instead of as in the patent:

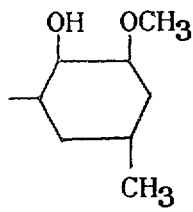

Signed and sealed this 13th day of September 1960.

(SEAL)
Attest:

KARL H. AXLINE                          ROBERT C. WATSON
Attesting Officer                   Commissioner of Patents